Patented June 10, 1930

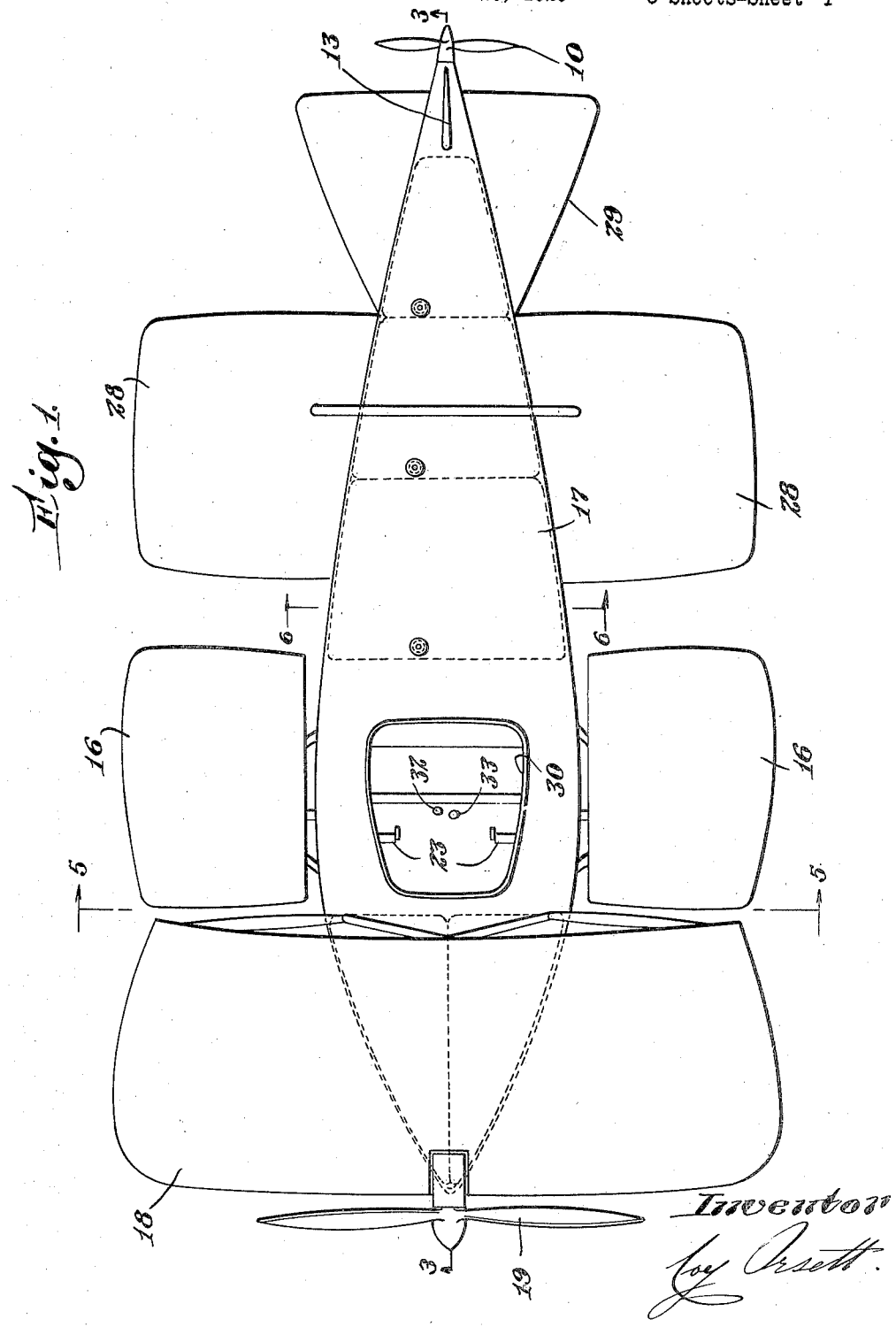

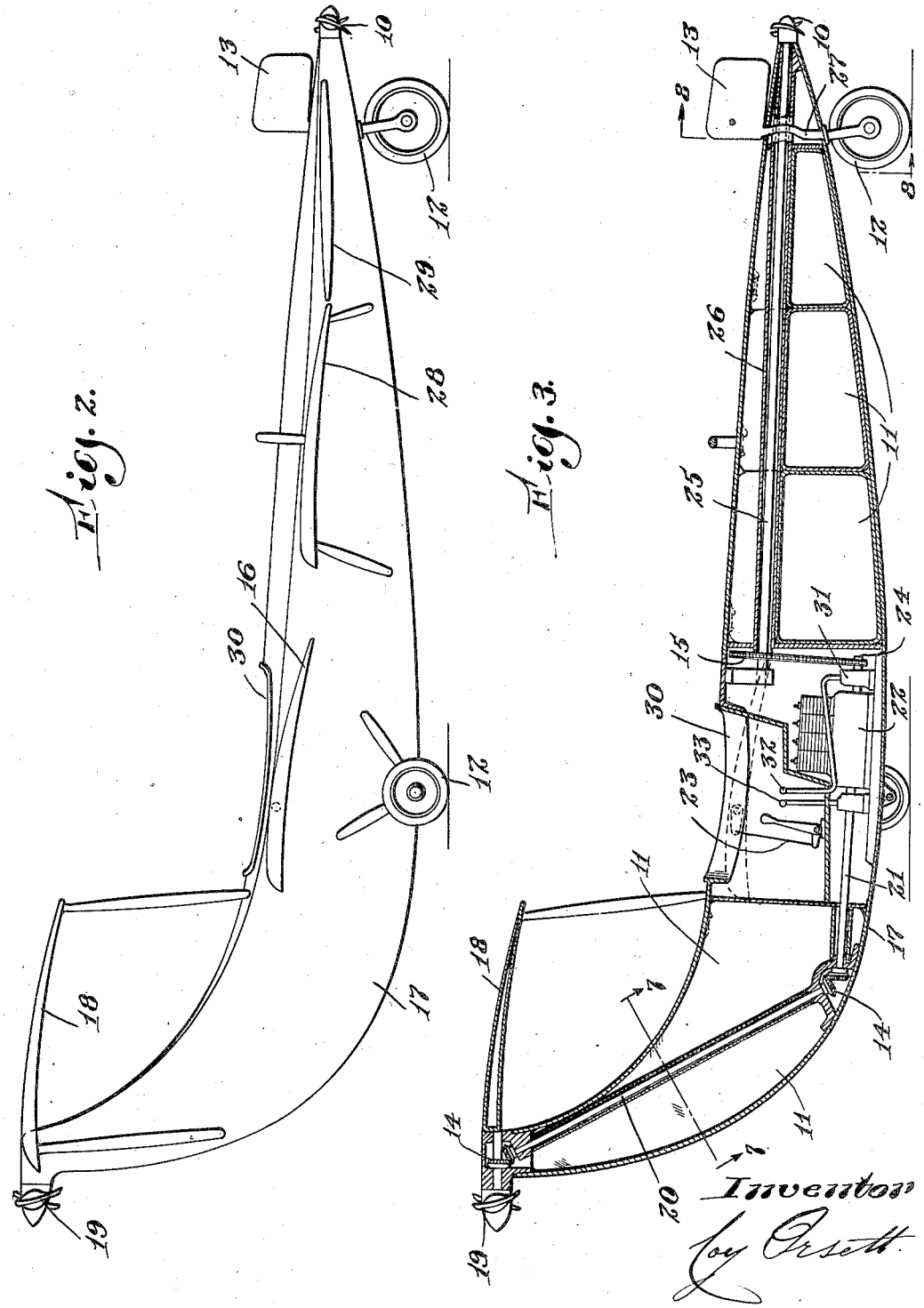

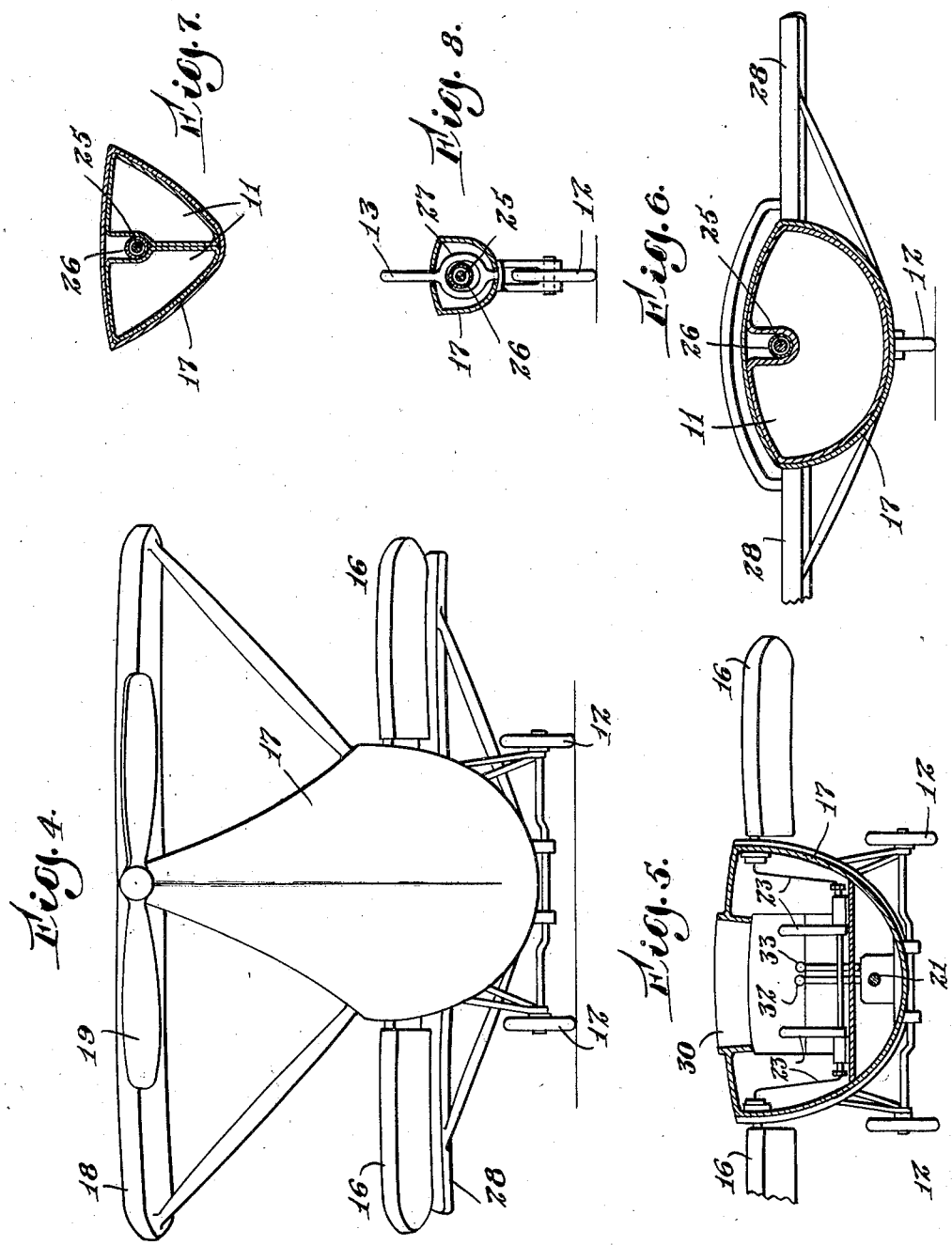

1,763,409

UNITED STATES PATENT OFFICE

COY ORSETT, OF BOSTON, MASSACHUSETTS

FLYING MACHINE

Application filed February 25, 1929. Serial No. 342,542.

It is a well appreciated fact that the present type of aeroplane has disadvantages at the time of landing, owing to a certain required velocity necessary for aerial sustenance and manipulation; while the dirigible type of aircraft does rely solely upon its gas capacity for its support.

Having the basic defects of these types in mind, I have now constructed a combination flying machine which is not primarily designed with a view of traveling at great velocity, but which shall be capable to ascend and descend without relying on velocity for sustenance, or gas capacity only for support. In order to incorporate these desirable features of these two types, I construct an aircraft of a combination of both for the purpose of obtaining safe, slow motion at the time of landing, and lateral wing sustenance in conjunction with gas lighter than atmospheric air, housed in a series of casings especially constructed to conform with the vacant interior structure of this seal-like shaped aircraft. Reference is had to the three attached sheets of drawings as illustrating the practical embodiment of my invention and in which drawing, Fig. 1 is a top plan view of a flying machine constructed in accordance with my invention.

Fig. 2 is a side view of same; Fig. 3 is a longitudinal section, showing the location of the gas containers, No. 11.

Fig. 4 is a front view of this type of aircraft showing the forward landing gear 12, location of rear body wing 28, movable fins 16, top main wing 18 and main drive propeller 19.

Fig. 5 is a cross section showing the interior arrangement for manipulation of movable fins 23, 32, 33.

Fig. 6, No. 17, is a cross section; 28 is the location of the rear body wing.

Fig. 7 is a section of the tapering rear end of the body 17, gas container 11.

Fig. 8 is the apparatus for manipulation, the steering rudder 13, landing wheel 12, the loop-eyed rudder stem 27, shaft 25, sleeve 26.

The power plant, Fig. 3, No. 22, is located at the lowest centre of gravity so as to render stability effective. Transmission boxes 31, manipulating appliance 23, means of propulsion for propellers 10, 15, 25, 26; location of main propeller 19, means of propulsion for rear drive shaft 25; gears connection 14, power drive 21, 22. Location of rear end landing wheel 12, steering rudder 13, the stem of which is loop-eyed in its middle 27, so as to allow the driveshaft to pass through same.

No. 21 is the geared shaft for propulsion of same with shaft No. 20.

No. 31 and 33 are the transmissions, No. 30 represents the cockpit, and 32 the operator's seat. No. 17 is the centre keel, while No. 18 represents the location and main top wing.

I construct the skeleton frame work of this craft of a seal-like shape with a towering head, Fig. 4, 17. Upon this head I affix the means of propulsion, Fig. 4, 19; and also the main top sustaining wing, Fig. 4, 18.

I construct the framework with a tapering rear end, on which end I affix a brake propeller through the driveshaft, for the purpose of checking the forward motion of the craft at the time of landing, Fig. 3, 10.

I construct the framework of this craft of a seal-like shape with a tubular keel, upper rails, and an intersplicing network of diagonally placed ribs, between the upper rail and the longitudinal centre keel.

I construct a pair of moveable fins, Fig. 2, 16, and it is by the manipulation of these fins that the craft ascends or descends, while the manipulation of the vertical rear end rudder effects the principle of steering the craft laterally around when in the air, and it is the means of steering this craft while it is on the ground, as the landing in this case is on three wheels, Fig. 4, No. 12, and Fig. 2, No. 12.

I place empty gas containers into the vacant spaces of the interior of this craft, made so as to conveniently conform with the interior of same, and inflated and deflated by means of ordinary valves, see Fig. 3, 11. The forward landing appliance is an ordinary axle, supported by a pair of wheels, said axle held in place at its terminals by suitable braces, Fig. 4, 12. At the rear end a disc wheel is the landing appliance which is manipulated by the aid of a pulley from the pilot's pit and which wheel turns sideways in conjunction with the rudder above it, Fig. 3, 12, 13. In operation I affix the power plant into the pilot's pit, Fig. 3, 22, so as to secure a low centre of gravity and the proper balance of this type of craft. I transmit the rotation of the motor to the main overhead propeller through the application of gears enclosed in suitable housings, Fig. 3, 14. 1 transmit the rotary motion to the rear end brake propeller through a connection with the shaft of the motor, either by belt or gears, Fig. 3, 15. A transmission at each end of the motor is necessary in order to obtain the desired effect.

Now in operation it will be appreciated that by having the gas containers filled with a gas lighter than atmospheric air, this craft will in effect prove buoyant. Therefore it shall be capable through the manipulation of the moveable fins to ascend and descend at a very moderate rate of forward motion, as it does not rely solely upon velocity for sustenance or gas capacity only as a main support.

A craft of this type should have greater stability, be subject to desired control, more than any of the types of flying machines now in vogue, especially through the effect of the rear and brake propeller which pulls the craft backwards at time of landing, and the fact that by having a fair volume of gas to effect buoyancy of the craft itself, the ordinary landing shock experienced by aeroplanes is considerably reduced if not entirely eliminated with this type of combination aircraft.

Obviously numerous modifications of structure might well be resorted to without in the least departing from the scope of my claims, which read:

1. A combination aeroplane-dirigible type of aircraft, the body form of which is of a seal-like shape with a vertically projecting frontal head, body portion tapering to a point at the rear end, the lateral main body wing of which is affixed upon the aforesaid front head, lateral side wings affixed on sides of body portion, steering means applied to the rear end of said body portion; main propulsive means affixed upon the projecting front head, and secondary propulsive means affixed at the tapered rear-end of said body portion.

2. A combination airplane-dirigible type of aircraft, the outline body form of which is of a seal-like shape; the integral frontal head part of which rises vertically and individually above the rail line of form of body portion; main overhead tiltable sustaining plane affixed upon said vertically projecting front head portion; means of forward propulsion affixed upon said projecting front head portion; secondary means of propulsion affixed at the tapered ear end part of body portion; means for lateral plane sustenance and stabilization affixed parallel within the rails of body portion; steering means for aerial and terrestrial function affixed at said rear end part of body portion; power plant located and affixed upon forward landing gear, transmitting rotary motion to propulsive means; means of aerial buoyancy through the expulsion of atmospheric air from within the interior vacant space of this aforesaid aeroplane-dirigible type of aircraft.

COY ORSETT.